(12) United States Patent
O'Neill et al.

(10) Patent No.: US 7,827,799 B2
(45) Date of Patent: Nov. 9, 2010

(54) DIRT SEPARATOR FOR COMPRESSOR DIFFUSER IN GAS TURBINE ENGINE

(75) Inventors: Lisa O'Neill, Manchester, CT (US); Edward F. Pietraszkiewicz, Southington, CT (US); Richard Silverman, Tolland, CT (US); Barry Beckwith, Coventry, CT (US)

(73) Assignee: United Technologies Corporation, Hartford, CT (US)

( * ) Notice: Subject to any disclaimer, the term of this patent is extended or adjusted under 35 U.S.C. 154(b) by 219 days.

(21) Appl. No.: 12/260,137

(22) Filed: Oct. 29, 2008

(65) Prior Publication Data

US 2009/0044512 A1    Feb. 19, 2009

Related U.S. Application Data

(62) Division of application No. 11/289,035, filed on Nov. 29, 2005.

(51) Int. Cl.
*F02C 1/00* (2006.01)
*F02G 3/00* (2006.01)

(52) U.S. Cl. .................................................. 60/751
(58) Field of Classification Search ............. 60/39.092, 60/751; 55/306, 459.1, 473; 471/313
See application file for complete search history.

(56) References Cited

U.S. PATENT DOCUMENTS

| | | | |
|---|---|---|---|
| 4,610,135 A * | 9/1986 | Alexander | ................. 60/39.01 |
| 4,685,942 A | 8/1987 | Klassen | |
| 4,765,751 A | 8/1988 | Pannone | |
| 5,261,228 A | 11/1993 | Shuba | |
| 5,279,109 A | 1/1994 | Liu et al. | |
| 5,592,821 A | 1/1997 | Alary | |
| 6,522,991 B2 | 2/2003 | Banaszuk | |
| 6,564,555 B2 | 5/2003 | Rice | |
| 6,698,180 B2 | 3/2004 | Snyder | |
| 7,181,914 B2 | 2/2007 | Pidcock | |
| 2002/0092303 A1* | 7/2002 | Al-Roub et al. | ............... 60/772 |

FOREIGN PATENT DOCUMENTS

| | | |
|---|---|---|
| GB | 2404603 A | 2/2005 |
| WO | 90/13734 A1 | 11/1990 |
| WO | 20040015257 A2 | 2/2004 |

OTHER PUBLICATIONS

European Search Report dated May 19, 2010.

* cited by examiner

*Primary Examiner*—Michael Cuff
*Assistant Examiner*—Andrew Nguyen
(74) *Attorney, Agent, or Firm*—Carlson, Gaskey & Olds

(57) ABSTRACT

A compressor diffuser for a gas turbine engine is provided with a dirt separator. The dirt separator ensures the air having moved downstream of the compressor section, and moving toward the combustion section, is separated into a dirtier air flow path directly radially outwardly, and a cleaner airflow path directed radially inwardly. In this manner, the air reaching a combustion section, and the air being utilized for radially inner cooling air is relatively cleaner air. Further, the dirt separator provides a convenient surface for mounting a pressure sensor. In one embodiment, the dirt separator is mounted within the diffuser housing, and in a second embodiment, it is mounted immediately downstream.

8 Claims, 4 Drawing Sheets

US 7,827,799 B2

DIRT SEPARATOR FOR COMPRESSOR DIFFUSER IN GAS TURBINE ENGINE

RELATED APPLICATIONS

This application is a divisional of U.S. patent application Ser. No. 11/289,035, filed Nov. 29, 2005.

BACKGROUND OF THE INVENTION

This application relates to the association of a dirt separator with a compressor diffuser for a gas turbine engine.

Gas turbine engines are provided with a number of functional sections, including a fan section, a compressor section, a combustion section, and a turbine section. Air and fuel are combusted in the combustion section. The products of the combustion move downstream, and pass over a series of turbine rotors, driving the rotors to power the compressors of the compressor section.

Numerous components within the gas turbine engine are subject to high levels of heat during operation. As an example, a turbine rotor will have a plurality of turbine blades that are driven by high temperature products of combustion to rotate and create the power. Cooling fluid, and typically air, is passed within a body of the turbine blades to cool the turbine blades. Air is also necessary for combustion.

The air passing through a gas turbine engine is often subjected to dirt and other impurities. It is desirable that the air utilized for cooling various components be relatively clean. The cooling of the components may be through relatively small passages, and the dirt and impurities can clog those small passages. The air passing from the compressor section passes through a diffuser. Directly downstream of the diffuser is the combustion section. It would be desirable for the air reaching the combustion section and being used for cooling to be as clean as possible.

The present invention is directed to separating dirtier air from cleaner air in the diffuser. This minimizes the amount of dirty air passing through the combustion section, and being used for cooling functions.

SUMMARY OF THE INVENTION

In the disclosed embodiment of this invention, a dirt separator is secured downstream of a compressor and upstream of a combustion section in a gas turbine engine. In one embodiment, the dirt separator is mounted within a compressor diffuser, and in a second embodiment, the dirt separator is mounted immediately downstream of the compressor diffuser. The dirt separator is configured such that it directs relatively dirty air downstream to radially outermost passages within the gas turbine engine. The air delivered to radially inner locations for cooling purposes, and into the combustion section is largely cleaner air, which is directed radially inwardly by the dirt separator. In a disclosed embodiment the dirt separator has curved surfaces to guide the dirty air radially outwardly and to guide the cleaner air toward the combustion section and the inner cooling passages.

In another feature, the dirt separator provides a convenient location for mounting a pressure sensor. In the prior art, some additional bracketing, etc., has been required to mount a pressure sensor at a location directly downstream of the compressor diffuser. The present invention thus provides a simple arrangement for mounting the sensor.

These and other features of the present invention can be best understood from the following specification and drawings, the following of which is a brief description.

DETAILED DESCRIPTION OF THE PREFERRED EMBODIMENT

Figure 1A:
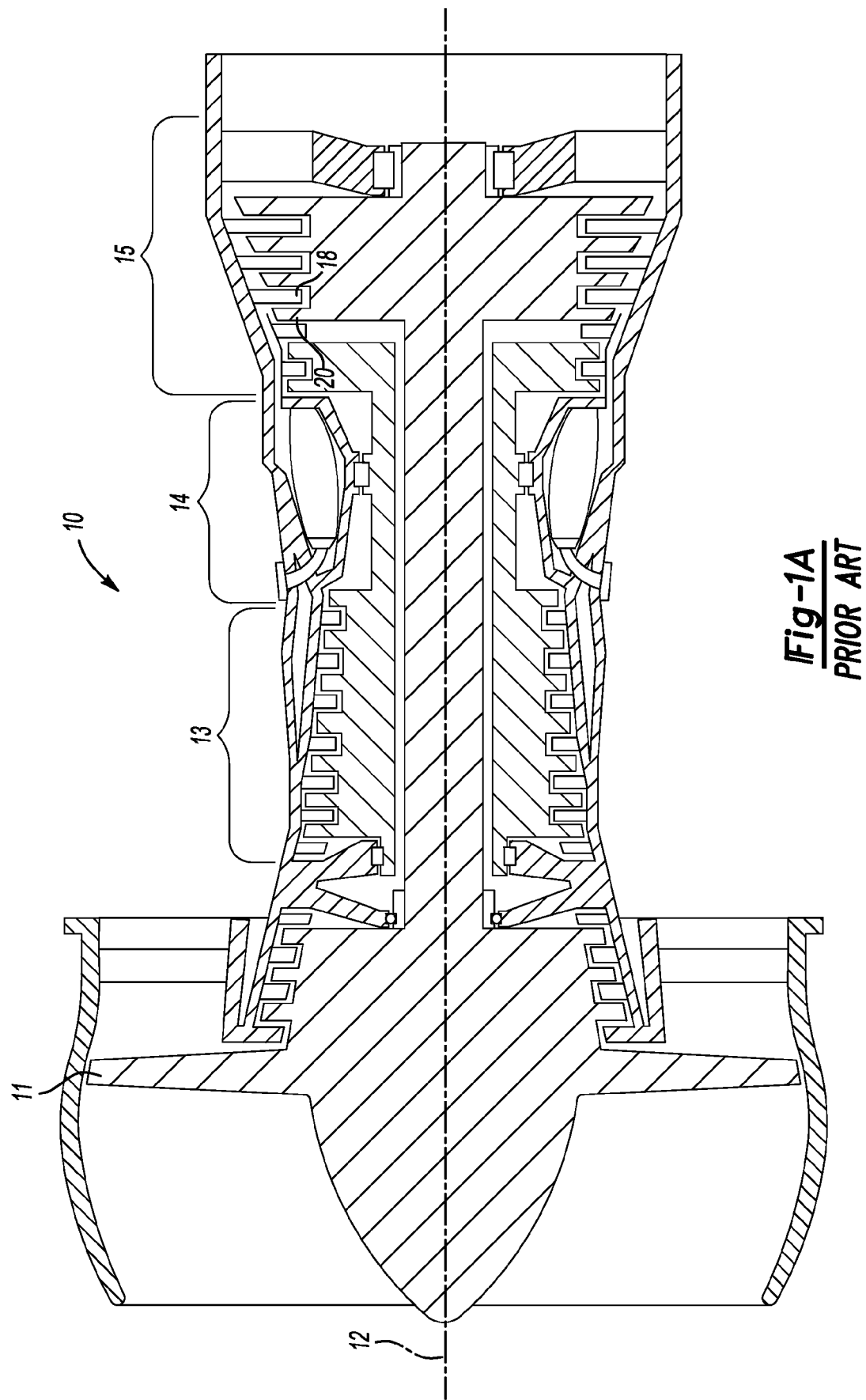
FIG. 1A is a highly schematic view of a gas turbine engine.

FIG. 1A shows a gas turbine engine 10. As known, a fan section 11 moves air and rotates about an axial center line 12. A compressor section 13, a combustion section 14, and a turbine section 15 are also centered on the axial center line 12. FIG. 1A is a highly schematic view, however, it does show the main components of the gas turbine engine. Further, while a particular type of gas turbine engine is illustrated in this figure, it should be understood that the present invention extends to other types of gas turbine engines.

The turbine section 15 includes a rotor having turbine blades 20, and stationary vanes 18. As mentioned above, these turbine blades 20 and vanes 18 become quite hot as the products of combustion pass over them to create power. Various cooling schemes are utilized for cooling these components.

Figure 1B:
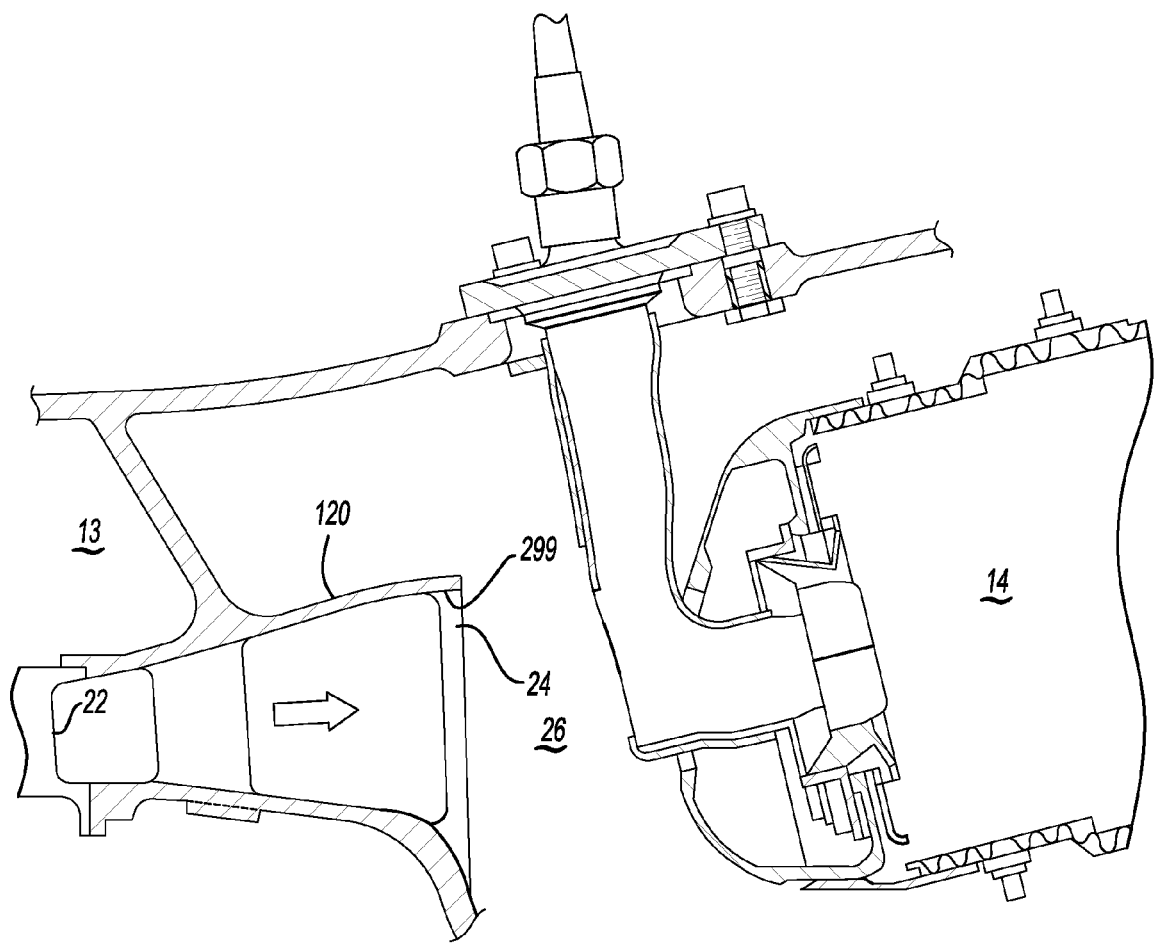
FIG. 1B is a view of a portion of the prior art gas turbine engine.

FIG. 1B focuses on a location intermediate the compressor section 13 and the beginning of the combustion section 14. As is known, a compressor diffuser 120 is positioned in this location to expand the flow of the air having passed through the compressor section 13. An inlet 22 has a smaller cross-sectional area than an outlet 24. A chamber 26 downstream of the diffuser 120 leads air into the combustion section 14 and both radially inwardly and radially outwardly of the combustion section where the air provides various cooling functions, such as at the turbine section.

In the prior art, the air leaving the compressor section 13 may be relatively dirty. When this dirty air reaches the combustion section 14, it can cause undesirable consequences. That is, the air moving within the combustion section to be mixed with fuel and burned contains dirty air. As an example, the dirt can clause glassy plasma deposits on burner liners and shorten the life of the liners. Further, as mentioned above, clog small cooling passages, which is undesirable.

Figure 2A:
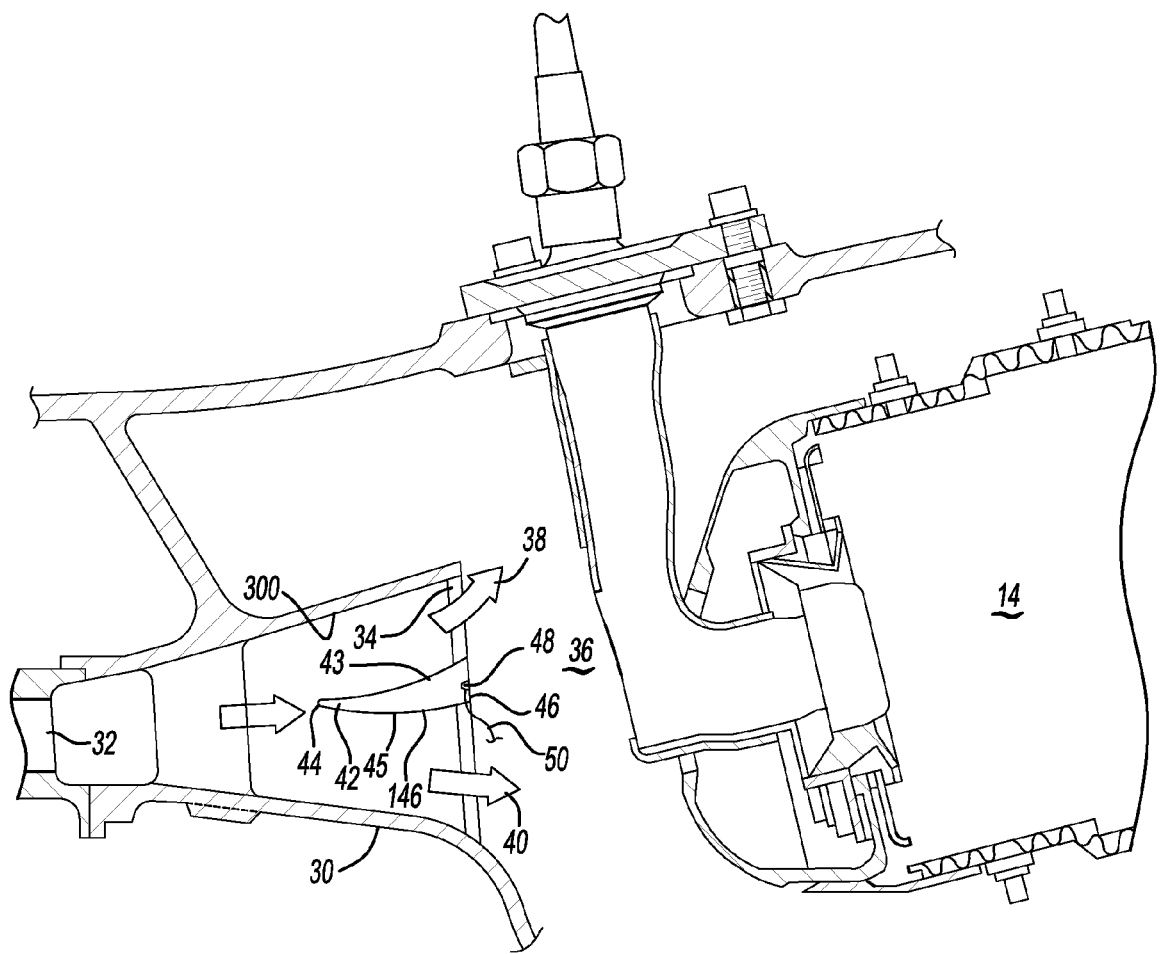
FIG. 2A is a view similar to FIG. 1B but showing the inventive compressor diffuser.

FIG. 2A shows an inventive difuser 30 wherein the inlet 32 and the outlet 34 function in a manner similar to the FIG. 1B embodiment. However, as is shown, a dirt separator 42 is positioned adjacent to the outlet 34. An apex 44 on the dirt separtator leads into a curved radially outer face 43, and a curved radially inner face 45. As can be appreciate, the curved radially outer face 43 guides the flow of air 38 radially outwardly, such that it will be largely radially outward of the combustion section 14, and pass into a radially outermost air flow channel.

The radially inner face 45 of the dirt separator 42 is also curved outwardly to an outlet end 146. Thus, a flow of air 40 is directed radially inwardly to radially inner cooling air channels, and also to the combustion section. Since the outlet end 146 does have a radially outward component, this clean air is also guided radially outwardly towards the combustion section 14. This flow of air 40 will tend to be cleaner air than the air flow 38. Heavier dirt laden air will tend to move radially outwardly due to centrifugal effects. Thus, the present invention directs cleaner air to the combustion section 14, and for inner cooling air purposes.

As can be seen in FIG. 2A, a radially outer surface 300 of the diffuser 30 flares radially outwardly. This assists in guiding the air flow 38 to the radially outer passages. Often in the prior art (see FIG. 1A), this surface 299 was not flared radially outwardly. This feature, particularly when combined with the dirt separator 42, assists in guiding the dirtier air flow radially outwardly.

Figure 2B:
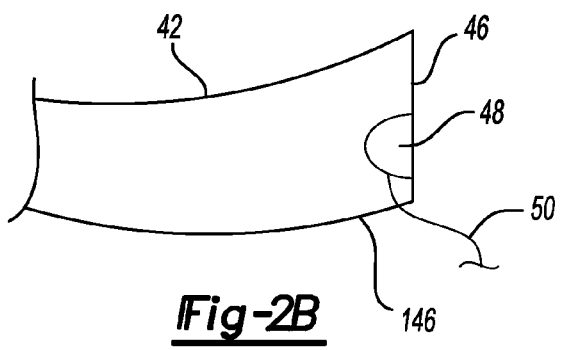
FIG. 2B shows an enlarged view of a portion of the FIG. 2A dirt separator.

As can be appreciated from FIG. 2B, outlet end 146 of radially inner face 45 curves outwardly with a small component in a radially outward direction. This will serve to direct some of the cleaner air, having initially been separated at the apex 44, in a radially outward direction, and in particular to the combustion section 14. That is, the cleaner air passes to the interior of the combustion section to be mixed with fuel and burned. Again, the air passing radially outwardly of the guide face 43 will pass radially outwardly of the combustion section.

FIG. 2B shows another feature of the present invention. A sensor 48 is mounted in an end face 46 of the dirt separator 42. The sensor 48 is a pressure sensor for sensing the pressure in chamber 36, which is directly downstream of the diffuser 30. A control wire 50 extends to a control, which may be an engine control. As is known, engine controls take any number of variables including the pressure from the chamber 36 and utilize these pressures to determine how to control the engine. By providing a sensor mount location in dirt separator 42, the present invention eliminates the need for a separate mount structure.

Figure 3:
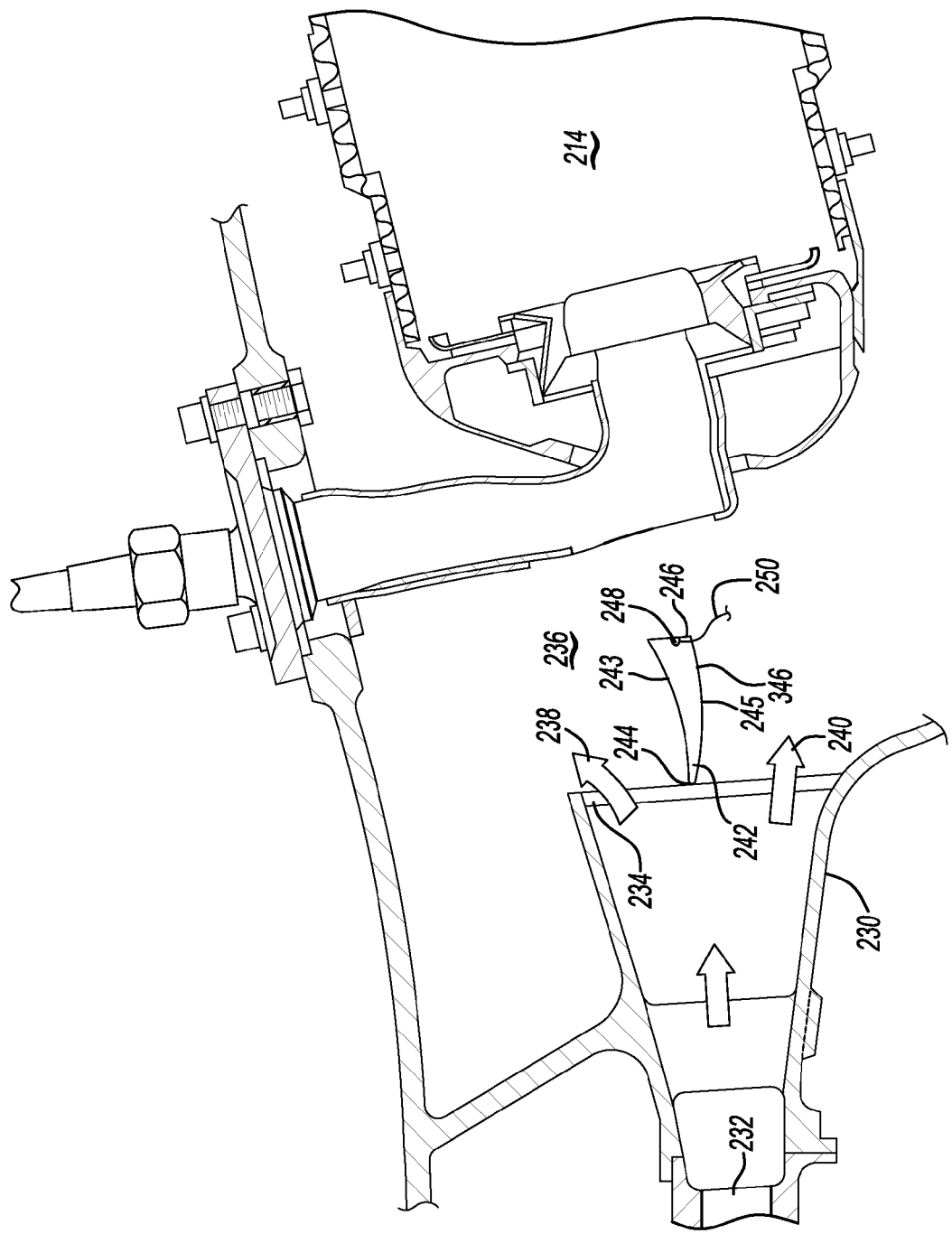
FIG. 3 shows another embodiment.

FIG. 3 shows another embodiment, which is similar to the FIG. 2A embodiment, however the dirt separator is mounted immediately downstream of the diffuser housing. This embodiment includes reference numerals which are each 200 higher than the reference numerals of FIG. 2A, and operates in a similar fashion to the FIG. 2A embodiment.

Although FIGS. 2A and 3 show only a single section, it should be appreciated that the diffuser and the dirt separator generally extend 360° about the center axis 12 (see FIG. 1A).

Although preferred embodiments of this invention have been disclosed, one of ordinary skill in the art would recognize a certain modification within the scope of this invention. For that reason, the following claims should be studied to determine the true scope and content of this invention.

What is claimed is:

1. A gas turbine engine comprising:
   a fan section;
   a compressor section, a compressor diffuser downstream of said compressor section;
   a combustion section downstream of said compressor diffuser; a turbine section downstream of said combustor section; said compressor diffuser having a housing including an inlet with a first cross-sectional area and an outlet with a second cross-sectional area, said second cross-sectional area being greater than said first cross-sectional area; and
   a dirt separator positioned downstream of said compressor section, and upstream of said combustion section, and adjacent said outlet, said dirt separator being operable to separate heavier dirt laden air to radially outer locations, and relatively cleaner air to radially inner locations, and such that the majority of the heavier dirt laden air, which is radially outward of said dirt separator is directed radially outwardly of a radially outermost surface of a combustion section to be mounted downstream of the diffuser, and such that air from a radially innermost location is directed toward the combustion section, and such that the air which does move into an interior of the combustion section to be mixed with fuel and burned is air from a location radially inward of said dirt separator.

2. The gas turbine engine as set forth in claim 1, wherein said dirt separator has a first curved face facing radially outwardly and a second curved face facing radially inwardly, with said first curved face directing the dirt laden air to radially outer locations.

3. The gas turbine engine as set forth in claim 2, wherein said second curved face initially directs the relatively cleaner air radially inwardly, and then curves radially outwardly to direct some air with a component of radially outward movement.

4. The gas turbine engine as set forth in claim 1, wherein a pressure sensor is mounted within said dirt separator.

5. The gas turbine engine as set forth in claim 4, wherein said pressure sensor is mounted in an end face of said dirt separator.

6. The gas turbine engine as set forth in claim 1, wherein said dirt separator is positioned within said diffuser housing.

7. The gas turbine engine as set forth in claim 1, wherein said dirt separator is positioned downstream of said outlet of said diffuser housing.

8. The gas turbine engine as set forth in claim 1, wherein a radially outer surface on said diffuser housing flares radially outwardly to assist in guiding the heavier dirt-laden air to the radially outer locations.

\* \* \* \* \*